United States Patent [19]

Sakikawa et al.

[11] Patent Number: 5,333,451
[45] Date of Patent: Aug. 2, 1994

[54] OIL PRESSURE CONTROL VALVE ASSEMBLY FOR HYDROSTATIC TRANSMISSIONS

[75] Inventors: Shigenori Sakikawa, Itami; Shinya Sakakura, Amagasaki, both of Japan

[73] Assignee: Kanzaki Kokyukoki Mfg. Co., Ltd., Amagasaki, Japan

[21] Appl. No.: 40,884

[22] Filed: Mar. 31, 1993

[30] Foreign Application Priority Data

Apr. 24, 1992 [JP]   Japan .................. 4-034476[U]

[51] Int. Cl.$^5$ ................ F16D 31/02; F16K 31/12
[52] U.S. Cl. ........................ 60/468; 60/488; 137/494; 251/50; 251/285
[58] Field of Search .............. 60/464, 468, 488, 494, 60/489; 137/494; 251/50, 52, 285

[56] References Cited

U.S. PATENT DOCUMENTS

| | | | |
|---|---|---|---|
| 1,124,203 | 1/1915 | Bingley | 251/285 X |
| 3,583,157 | 6/1971 | Adams et al. | 60/488 X |
| 3,735,590 | 5/1973 | Bobst | 60/488 X |
| 3,770,240 | 11/1973 | Mito et al. | 251/50 X |
| 3,802,460 | 4/1974 | Grosseau | 137/494 |
| 4,209,988 | 7/1980 | Langworthy et al. | 60/464 X |
| 4,223,693 | 9/1980 | Kosarzecki | 251/52 X |
| 4,494,624 | 1/1985 | Scheuerle et al. | 60/488 X |
| 4,520,625 | 6/1985 | Sato et al. | 60/468 X |

FOREIGN PATENT DOCUMENTS 3-100659  10/1991  Japan .

*Primary Examiner*—Edward K. Look
*Assistant Examiner*—John Ryznic

[57] ABSTRACT

In a valve mechanism for controlling oil pressure in an oil path (13) connecting between a hydraulic pump (11) and motor (12) of a hydrostatic transmission (10), a differential piston (23) serving as a relief valve member for gradually increasing the oil pressure has a larger pressure-applied surface area at the side opposite to the oil path than at the side of this path. A throttled oil passage (24) is provided for conducting oil pressure in the path to the larger surface area. The piston is biased by a valve spring (25) through a control piston (26). A receiving member (27) for the spring and a stopper member (28) for the control piston are provided such that they are adjustable in position independently of each other. By this, the manner of increasing the oil pressure may be adjusted in a large variety. The valve mechanism also serves as a relief valve for excluding a possible, excessively high pressure.

2 Claims, 2 Drawing Sheets

OIL PRESSURE CONTROL VALVE ASSEMBLY FOR HYDROSTATIC TRANSMISSIONS

FIELD OF THE INVENTION

This invention relates to a valve assembly for controlling oil pressure in an oil path which connects between a hydraulic pump and hydraulic motor of a hydrostatic transmission employed in a vehicle such as a tractor for changing the vehicle traveling speed in a non-stepwise manner.

BACKGROUND OF THE INVENTION

In a hydrostatic transmission, an abnormally high oil pressure may be caused in an oil path between a hydraulic pump and hydraulic motor during the time when the pump has been started up but the motor has not been driven to rotate yet. Such abnormally high oil pressure may be caused also during a normal operating condition of the hydrostatic transmission when load applied to the motor is suddenly increased. Further, an abnormally high oil pressure may be caused during the time when the pump has been stopped but the motor is still rotating due to its inertia. There is known from JP, U No. 3-100659 an oil pressure control valve assembly which is operable as a relief valve for excluding such abnormally high oil pressure and also as a relief valve for increasing oil pressure in the oil path between the pump and motor gradually after a start-up of the hydrostatic transmission so as to assure a shock-free start of a vehicle in which the hydrostatic transmission is employed.

This relief valve assembly is fashioned such that it relieves oil from the oil path between the hydraulic pump and hydraulic motor to an oil-charging path from a charging pump for supplementing working oil to the hydrostatic transmission. Relief valve member of the valve assembly is particularly composed of a differential piston which has a first pressure-applied surface area at the side of the oil path between the pump and motor and a second pressure-applied surface area which is located opposite to the first surface area and is larger than the first surface area. A throttled oil passage is associated with this differential piston for conducting oil pressure in the oil path between the pump and motor to the side of differential piston having the second oil pressure-applied surface area. A control piston is disposed co-axially with the differential piston, and a valve spring is provided such that it biases the differential piston through the control piston.

Consequently, an abnormally high oil pressure which may be caused in an oil path between the pump and motor during the time between a start-up of the pump and the start of rotation of the motor is excluded to the oil-charging path by an oil-relieving operation of the differential piston which is moved to an oil-relieving position by the oil pressure applied to the first surface area against the biasing force of the valve spring with pushing the control piston to move toward the spring. Then, oil pressure in the oil path between the pump and motor is gradually applied to the second pressure-applied surface area of differential piston, which is larger than the first surface area, through the throttled oil passage so that oil-relieving pressure of the differential piston is gradually increased. By this, oil pressure in the oil path between the pump and motor is gradually increased so that a shock-free start of the vehicle is assured. At a normal operating condition, the differential piston takes a position remotest from the control piston due to the difference in surface area between the first and second pressure-applied surface areas and, at such position, it blocks the oil path between the pump and motor from the oil-charging path. An abnormally high oil pressure, which may be caused during a normal operating condition of the hydrostatic transmission, as well as an abnormally high oil pressure which may be caused during an inertial rotation period of the motor after stopping the pump will also be excluded to the oil-charging path by the differential piston.

In a pressure control valve assembly of the known structure set forth above, the manner how the oil pressure in a fluid path between the hydraulic pump and motor is increased after the start-up of a hydrostatic transmission can be much influenced by the force of the valve spring and by the predetermined stroke of the differential and control pistons. The known valve assembly is not fashioned so as to permit adjustment of these factors. However, the manner of increase in oil pressure will provide much effect on the feeling of an operator at the time when a vehicle is started. Further, with respect to a working vehicle such as a tractor, it is desirable to adjust the manner of increase in oil pressure in response to a working or auxiliary implement, such as mower, trailer, blading device, cultivator or the like, to be used in conjunction with the vehicle or in response to the type of the vehicle such that, by way of example, when the inertial mass to be driven by the hydrostatic transmission is large, the oil pressure is increased as from a relatively high starting pressure at a relatively high rate.

Accordingly, a primary object of the present invention is to provide an improved pressure control valve assembly which permits a large variety of adjustment of the manner in which oil pressure in an oil path between a hydraulic pump and hydralic motor of a hydrostatic transmission is increased after the transmission is started up.

SUMMARY OF THE INVENTION

The present invention relates to an oil pressure control valve assembly for a vehicle hydrostatic transmission of the type which comprises: a first port to be connected to an oil path connecting between a hydraulic pump and hydraulic motor of the hydrostatic transmission; a second port to be connected to an oil-charging path from a charging pump for supplementing working oil to the hydrostatic transmission; a differential piston which is operable as a relief valve member for relieving oil from the first port to the second port and which has at the side of the first port a first pressure-applied surface area and at the opposite side a second pressure-applied surface area which is larger than the first surface area; a throttled oil passage for conducting oil pressure at the first port to the opposite side of the differential piston having the second surface area; a control piston which is disposed co-axially with the differential piston; and a valve spring which is adapted to bias the differential piston through the control piston to move toward the first port.

According to the present invention, there are provided a spring-receiving member for receiving an end of the valve spring at the side opposite to the control piston and a stopper member for limiting a movement of the control piston in a direction away from the differential piston such that the spring-receiving member and the stopper member are adjustable in position independently of each other in a direction toward and away from the control piston.

Consequently, the force of the valve spring may be varied or adjusted by adjusting the position of the spring-receiving member in the direction toward and away from the control piston. Independently of this adjustment, the stroke of the differential piston and control piston may be varied or adjusted by adjusting the position of the stopper member in the direction toward and away from the control piston. This permits a large variety of adjustment of the manner in which oil pressure in an oil path between the hydraulic pump and motor of hydrostatic transmission is increased after the transmission is started up, as will be detailed later by referring to FIG. 4.

BRIEF DESCRIPTION OF THE DRAWINGS

The present invention and its attendant advantages will become increasingly apparent as the specification is considered in conjunction with the accompanying drawings in which.

DESCRIPTION OF A PREFERRED EMBODIMENT

Figure 1:
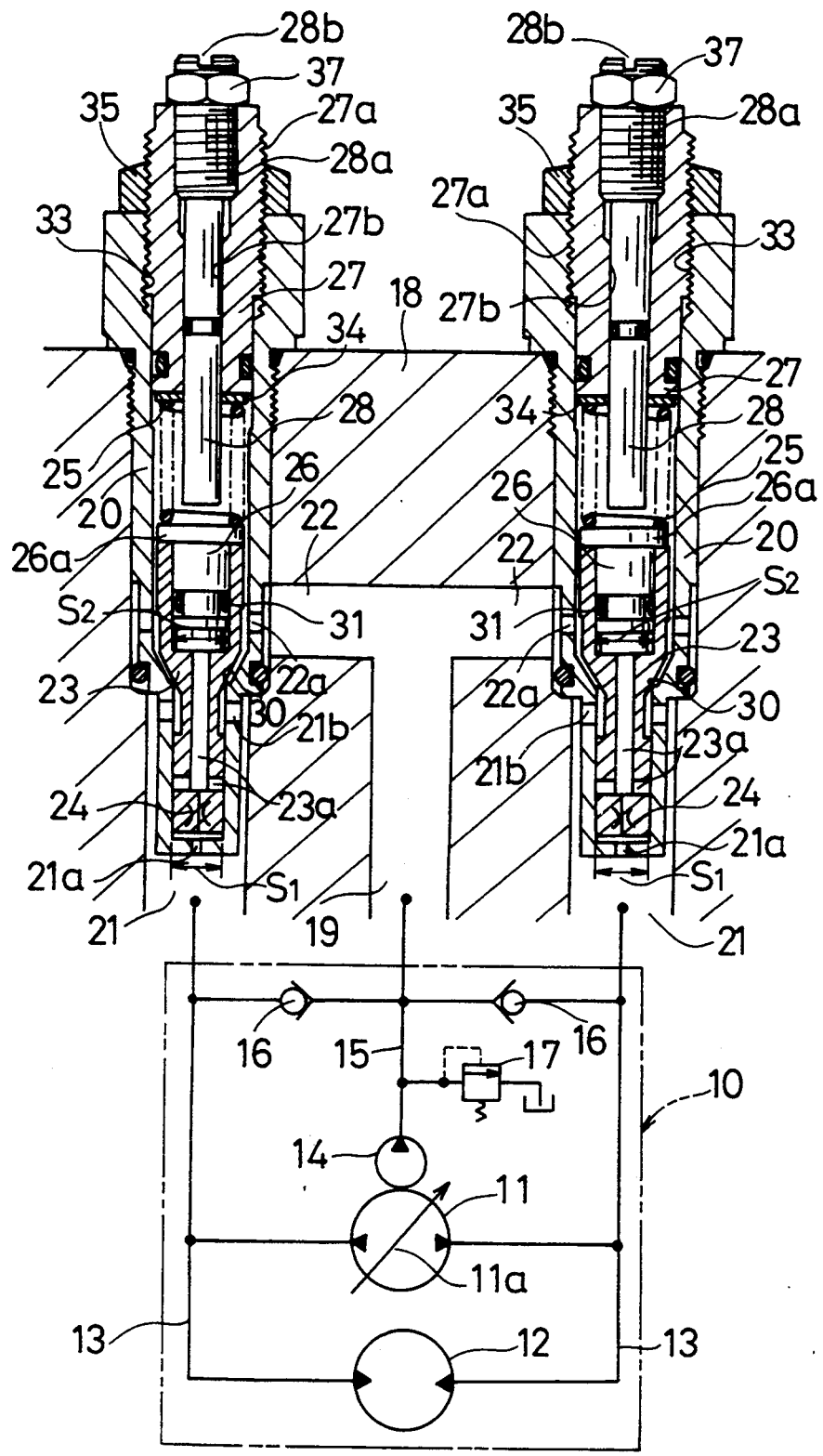
FIG. 1 is a sectional view of an embodiment of the valve assembly according to the present invention, showing also a vehicle hydrostatic transmission schematically with a fluid circuit diagram.

In FIG. 1, a preferred embodiment of the present invention is shown together with a hydrostatic transmission 10 which is illustrated with a simplified fluid circuit diagram. As is usual, the hydrostatic transmission 10 comprises a hydraulic pump 11 of a variable displacement type, the displacement of which is varied or controlled by its swash plate 11a, and a hydraulic motor 12 of a fixed displacement type. These hydraulic pump and motor are connected with each other by a pair of oil paths 13 in a closed loop fashion. An oil-charging path 15 from a charging pump 14 for supplementing working oil to the hydrostatic transmission 10 is connected to each of the oil paths 13 through a check valve 16 which prevents a reverse flow of oil. Oil pressure in the oil-charging path 15 is established or determined by a relief valve 17 which operates at a low pressure such as 5 kg/cm$^2$.

Within a valve housing 18 for housing valves associated with the hydrostatic transmission 10, a pair of oil pressure control valve mechanisms are disposed for controlling oil pressure in the left and right (as viewed in FIG. 1) oil paths 13. A pair of first ports 21 for these valve mechanisms are formed in the valve housing 18 and are connected to the pair of oil paths 13. A port 19 is provided and is communicated via oil passages within the housing 18 to second ports 22 for the pair of pressure control valve mechanisms. The valve mechanisms of left and right sides of FIG. 1 comprises valve casings 20, each a bottomed hollow cylinder-shaped, which are formed separately from the valve housing 18 and are installed in a pair of parallel valve-accomodating bores in the housing 18.

Each valve casing 20 has at its innermost end or bottom wall a thorough bore 21a of a relatively small size, which communicates with the corresponding first port 21, and at its side wall a thorough bore 22a which communicates with the corresponding second port 22. The valve casing 20 further has at its side wall and somewhat below the bore 22a a thorough bore 21b which communicates with the first port 21 through a space around a diameter-reduced lower portion of the casing 20. Between the bores 21b and 22a, a frust-conical surface portion is provided in the inner circumferential surface of the valve casing 20 at the lower end of which an annular valve seat 30 is formed. A differential piston 23 having a frust-conical portion which is somewhat smaller in diameter than the frust-conical surface portion of the casing 20 is slidably disposed within the valve casing such that it may be seated at its frust-conical portion on the valve seat 30 so as to cut off oil communication between the bore 21b and 22a and, therefore, between the first and second ports 21 and 22.

Figures 2, 3:
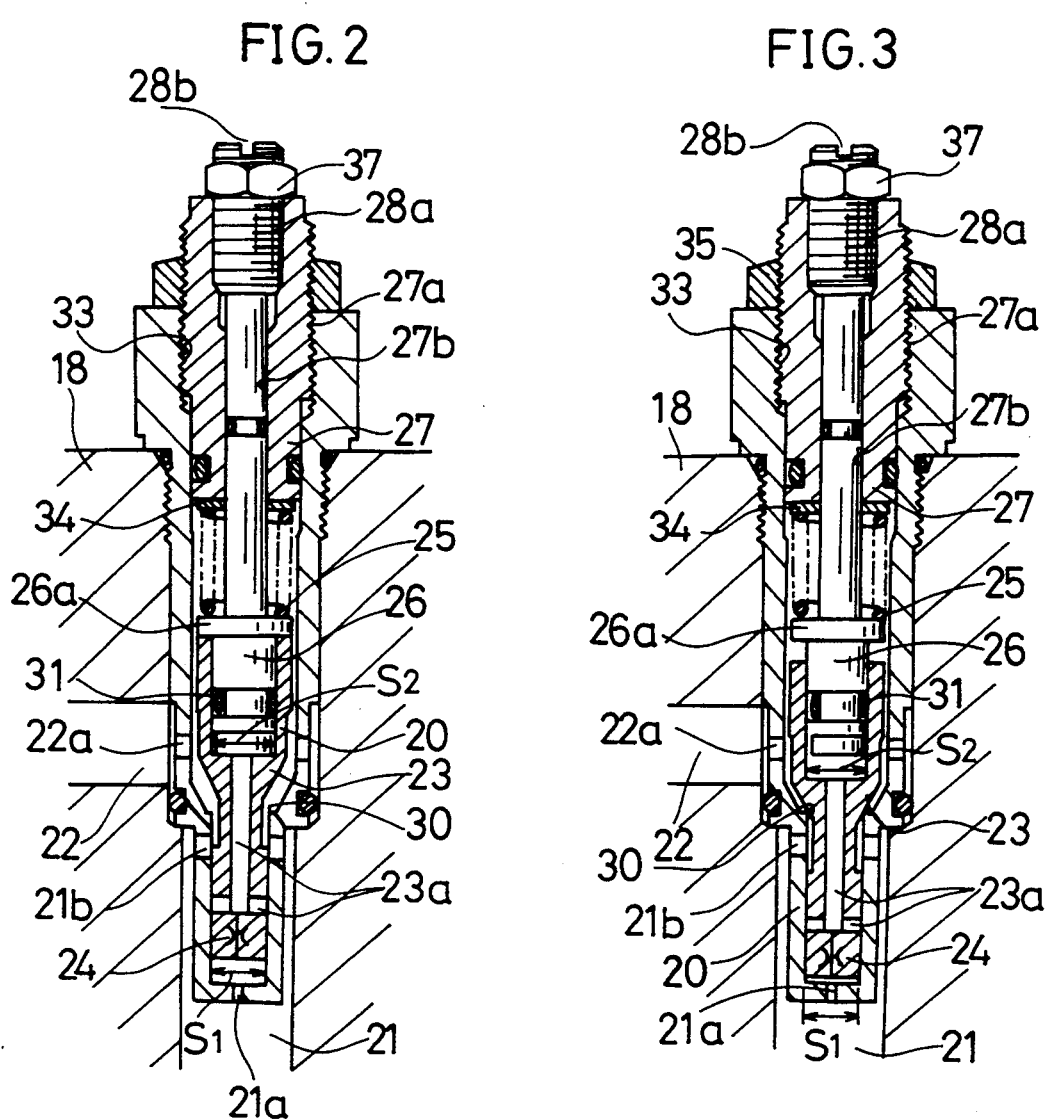
FIG. 2 is a sectional view illustrating the valve mecanism of the right side of FIG. 1 in a different state.
FIG. 3 is a sectional view of the valve mechanism shown in FIG. 2 in a still different state.

The differential piston 23 further has a cylindrical portion of a relatively small diameter, which extends downwards from the lower end of the frust-conical portion, and a hollow cylindrical portion of a relatively large diameter which extends upwards from the upper end of the frust-conical portion. A first pressure-applied surface area $S_1$ of the differential piston 23 is provided at the side of the first port 21 by the lower end face of the lower cylindrical portion, whereas a second pressure-applied surface area $S_2$ of the piston 23 which is larger than the first surface area $S_1$ is provided at the opposite side by the inner bottom surface of the upper, hollow cylindrical portion. The lower cylindrical portion of piston 23 includes a diameter-reduced upper end portion so as to secure, when the differential piston 23 performs its oil-relieving operation as shown in FIG. 2, an oil passage between the bores 21b and 22a. A throttled oil passage 24 which is illustrated with an orifice symbol is provided by a small clearance between the inner circumferential surface of the valve casing 21 and the outer circumferential surface of a lower end portion of the piston 23. This throttled oil passage 24 is communicated to the inner bottom end of the upper, hollow cylindrical portion of piston 23 by an oil passage 23a formed in the differential piston.

A cylindrical control piston 26 is slidably fitted into the upper, hollow cylindrical portion of differential piston 23 and has a diameter-enlarged head 26a which is engageable to the upper end of differential piston 23. An O-ring 31 is disposed between these pistons 23 and 26 for preventing leakage of oil toward an upper side of the differential piston 23.

A valve spring 25 is provided and engages at its lower end to an upper face of the head 26a of control piston 26 so that the spring biases the differential piston 23 through the control piston 26 to move toward the first port 21. The upper end of this valve spring 25 is received through a ring 34 by a cylindrical spring-receiving member 27 which is disposed co-axially with the pistons 23 and 26 and is threadingly engaged with a threaded portion 33 in the inner circumferential surface of an upper end portion of the valve casing 20. Threaded portion 27a of the spring-receiving member 27 has on it an adjusting nut 35 which abuts on the upper end face of the valve casing 20. Consequently, the spring-receiving member 27 may be adjusted or varied in position in the direction toward and away from the control piston 26 by providing a rotation to the adjusting nut 35. In the embodiment shown, outer diameter of the upper, hollow cylindrical portion of differential piston 23 and that of the head 26a of control piston 26 are sized such that an annular clearance which conducts oil pressure at the second port 22 to an upper side of the control piston 26 is provided around the differential piston 23 and head 26a at the inside of the valve casing 20.

The spring-receiving member 27 includes an axial thorough bore 27b through which a rod-shaped stopper member 28 extends. This stopper member 28 has a threaded upper end portion 28a which is threadingly engaged with a nut 37 fixedly secured to the upper end face of the receiving member 27. The stopper member 28 includes in its outer end face a tool-engaging recess 28b. The control piston 26 is prevented from moving toward the direction away from the differential piston 23 when the piston 26 becomes in abutment with the stopper member 28, as shown in FIGS. 2 and 3. The stopper member 28 may be adjusted or varied in position in the direction toward and away from the control piston 26 by providing a rotation to this member using a rotating tool which is to be engaged to the member 28 at the engaging recess 28b. The stopper member 28 which extends through the spring-receiving member 27 and is adjustably supported by this member 27 requires no additional support means.

Figure 4:
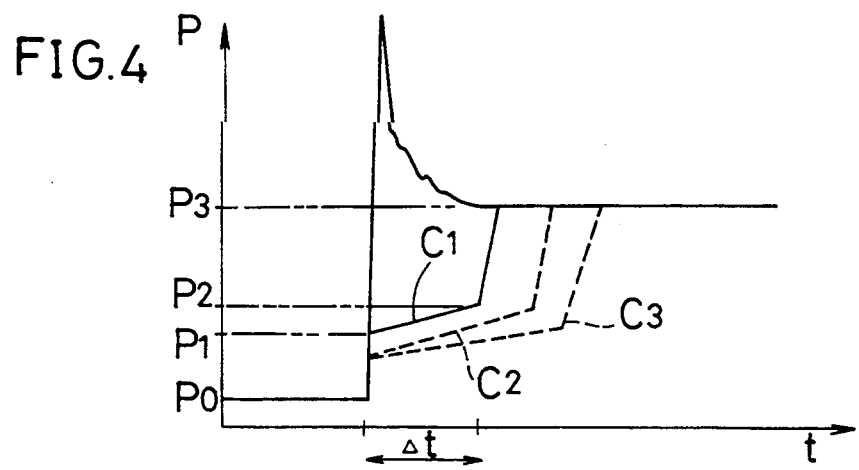
FIG. 4 is a schematic graph illustrating the operation of the embodiment.

The oil pressure control valve assembly shown operates as follows:

When the hydrostatic transmission 10 is started up from the neutral condition shown in FIG. 1 to an operative condition where oil is pumped by the hydraulic pump 11 into the oil path 13 of the right side of FIG. 1, oil may be confined within this oil path 13 until the hydraulic motor 12 has been driven to rotate by oil under pressure. Consequently, oil pressure in the oil path 13 may be hightened suddenly to an abnormally high pressure as shown in FIG. 4. However, when the oil pressure is hightened to the oil-relieving pressure of the differential piston 23 which pressure is determined by the valve spring 25, the piston 23 is moved by oil pressure applied to the first surface area $S_1$ to an oil-relieving position shown in FIG. 2 with pushing the control piston 26 to move against the biasing force of spring 25 so that oil is relieved from the oil path 13 to the oil-charging path 15 whereby the sudden increase in oil pressure is cut off at a low oil pressure $P_1$ shown in FIG. 4. Then, as oil flows from the first port 21 gradually through the throttled oil passage 24 to the side of differential piston 23 having the second surface area $S_2$, the oil-relieving pressure of the differential piston 23 is gradually increased due to a gradual compression of the valve spring 25 and due to a pressure differential based on the area differential $(S_2-S_1)$. The control piston 26 becomes then in abutment with the stopper member 28, as shown in FIG. 2, so that the biasing force of valve spring 25 is hightened to a maximum value. As the pressure differential based on the area differential $(S_2-S_1)$ is gradually increased as oil flows through the throttled oil passage 24 to the side having the second surface area $S_2$, the differential piston 23 continues to perform its oil-relieving operation with accompanying a gradual increase in its oil-relieving pressure during a some time interval $\Delta t$ shown in FIG. 4. And then, when oil pressure in the oil path 13 has reached a higher value $P_2$, the differential piston 23 takes a piston where it is seated on the valve seat 21b so as to block the first port 21. Thereafter, oil pressure in the oil path 13 is increased relatively rapidly to a value $P_3$ which is determined by a load driven by the hydraulic motor 12. Because oil pressure of this value $P_3$ is applied also to the second surface area $S_2$, the differential piston 23 is forced toward the first port 21 by a high pressure differential based on the area differential $(S_2-S_1)$ so that it blocks, as shown in FIG. 3, the first port 21 at the position remotest from the control piston 26 so as to prevent leakage of oil pressure from the oil path 13 with certainty.

When an abnormally high oil pressure is going to be caused in the oil path 13 due to, for example, a sudden increase in load applied to the hydraulic motor 12 during the normal operating condition shown in FIG. 3, the differential piston 23 may perform an oil-relieving operation because application of a suddenly caused high pressure to the second surface area $S_2$ is delayed by the throttled oil passage 24. Consequently, such high pressure is excluded to the oil-charging path 15 by an oil-relieving operation of the differential piston 23. When the hydraulic pump 11 is stopped so as to stop the operation of the hydrostatic transmission from the condition shown in FIG. 3, oil may be confined in the oil path 13 of the left side of FIG. 1, into which oil may be pumped by an inertial rotation of the hydraulic motor 12, so that an abnormally high oil pressure may be caused in this oil path 13. However, such oil pressure is also excluded because the differential piston 23 in the valve mechanism of the left side of FIG. 1 performs its oil-relieving operation in a manner similar to the one shown in FIG. 2. In addition, an unexpected start of the vehicle from a neutral condition of the hydrostatic transmission, which start may occur when the pump swash plate 11a is in a slight inclination so that oil is pumped into one of the oil paths 13, is well prevented by an oil-relieving operation of one of the differential pistons 23.

In the valve assembly according to the present invention, the force of the valve spring 25 may be varied or adjusted by adjusting the position of the spring-receiving member 27 in the direction toward and away from the control piston 26. Independently of this adjustment, the stroke of the control piston 26 and differential piston 23 may be varied or adjusted by adjusting the position of the stopper member 28 in the direction toward and away from the control piston 26. The adjustability of force of the valve spring 25 permits adjustment of the oil pressure $P_1$ shown in FIG. 4 from which a gradual increase in oil pressure is started. This adjustability of the spring force also permits adjustment of the oil pressure $P_2$ shown in FIG. 4 at which the differential piston 23 stops its oil-relieving operation, because the piston 23 performs its oil-relieving operation under the biasing by means of the spring 25 as well as pressure differential based on the area differential $(S_2-S_1)$. The adjustability of the spring force further permits adjustment of speed of movement of the control piston 26 which is moved against the biasing force of spring 25. The adjustability of the stroke of pistons 23 and 26 permits adjustment of the time interval $\Delta t$ shown in FIG. 4, through which oil pressure is gradually increased, and adjustment of rate of such gradual increase in oil pressure. This adjustability of the piston stroke also permits adjustment of the oil pressures $P_1$ and $P_2$ shown in FIG. 4 because the most compressed state of valve spring 25 shown in FIGS. 2 and 3 is varied in response to the piston stroke. Consequently, the manner or mode in which oil pressure in an oil path connecting the hydraulic pump and motor of a hydrostatic transmission is increased can be varied or adjusted almost freely as illustrated in FIG. 4 with curves $C_1$, $C_2$ and $C_3$.

The gradual increase in oil pressure through the time interval Δt shown in FIG. 4 assures a shock-free start of the vehicle. Oil pressure $P_0$ shown in FIG. 4 is the one at the neutral condition which is determined by the relief valve 17 shown in FIG. 1. In the embodiment shown, this pressure $P_0$ is conducted through the second port 22 and through the annular clearance around the upper portion of differential piston 23 and head 26a of control piston 26 to the upper side of control piston 26 so that the differential piston 23 is biased at its oil-relieving condition shown in FIG. 2 by both of the valve spring 25 and oil pressure $P_0$. This contributes to the employment of a lighter spring as the valve spring 25.

We claim:

1. An oil pressure control valve assembly for a vehicle hydrostatic transmission which comprises: a first port (21) connected to an oil path connecting between a hydraulic pump and hydraulic motor of the hydrostatic transmission; a second port (22) connected to an oil-charging path from a charging pump for supplementing working oil to the hydrostatic transmission; a differential piston (23) operable as a relief valve member for relieving oil from said first port (21) to said second port (22), said differential piston having at the side of said first port (21) a first pressure-applied surface area ($S_1$) and at the opposite side a second pressure-applied surface area ($S_2$) which is larger than said first surface area ($S_1$); a throttled oil passage (24) for conducting oil pressure at said first port (21) to said opposite side of said differential piston (23) having said second surface area ($S_2$); a control piston (26) disposed co-axially with said differential piston (23); and a valve spring (25) adapted to bias said differential piston (23) through said control piston (26) to move toward said first port (21), characterized in:

that there are provided a spring-receiving member (27) for receiving an end of said valve spring (25) at the side opposite to said control piston (26) and a stopper member (28) for limiting a movement of said control piston (26) in a direction away from said differential piston (23) such that said spring-receiving member (27) and said stopper member (28) are adjustable in position independently of each other in a direction toward and away from said control piston (26).

2. The oil pressure control valve assembly as set forth in claim 1, wherein said stopper member (28) extends through said spring-receiving member (27) and is adjustably supported by said spring-receiving member.

* * * * *